US010830371B2

(12) United States Patent
Raff et al.

(10) Patent No.: US 10,830,371 B2
(45) Date of Patent: Nov. 10, 2020

(54) ELECTROMAGNETIC VALVE AND USE THEREOF

(71) Applicant: ETO Magnetic GmbH, Stockach (DE)

(72) Inventors: Viktor Raff, Constance (DE); Oliver Thode, Stockach (DE)

(73) Assignee: ETO Magnetic GmbH, Stockach (DE)

( * ) Notice: Subject to any disclaimer, the term of this patent is extended or adjusted under 35 U.S.C. 154(b) by 57 days.

(21) Appl. No.: 16/070,308

(22) PCT Filed: Dec. 20, 2016

(86) PCT No.: PCT/EP2016/082010
§ 371 (c)(1),
(2) Date: Jul. 16, 2018

(87) PCT Pub. No.: WO2017/121587
PCT Pub. Date: Jul. 20, 2017

(65) Prior Publication Data
US 2019/0024817 A1 Jan. 24, 2019

(30) Foreign Application Priority Data
Jan. 14, 2016 (DE) .................. 10 2016 100 604

(51) Int. Cl.
F16K 31/06 (2006.01)
F16K 27/00 (2006.01)
F16K 1/46 (2006.01)

(52) U.S. Cl.
CPC ............ F16K 31/0627 (2013.01); F16K 1/46 (2013.01); F16K 1/465 (2013.01); F16K 27/003 (2013.01);
(Continued)

(58) Field of Classification Search
CPC .......... F16K 1/44; F16K 1/46; F16K 31/0606; F16K 31/0627; F16K 27/003
(Continued)

(56) References Cited

U.S. PATENT DOCUMENTS 2,812,776 A 11/1957 Lofftus et al.
3,747,623 A * 7/1973 Greenwood ........ F15B 13/0839
137/269
(Continued)

FOREIGN PATENT DOCUMENTS

CN 103062403 A 4/2013
DE 3506493 A1 9/1985
(Continued)

OTHER PUBLICATIONS

International search report for patent application No. PCT/EP20161082010 dated Mar. 21, 2017.
(Continued)

Primary Examiner — Seth W. MacKay-Smith
(74) Attorney, Agent, or Firm — Bachman and LaPointe PC; George Coury

(57) ABSTRACT

An electromagnetic valve has an armature (22) movable along an axial direction in a valve housing (14) as a reaction to current flowing through a stationary coil (16) and which at one axial end has a sealing member (28) designed to interact with a valve seat (32) assigned to a first valve inlet (P), wherein at least one second valve inlet and/or outlet (A, R) in the valve housing can be opened to the first valve inlet (P) by action of the armature, and wherein the sealing member is provided as sealing bodies (28) on a portion (26) of the armature of narrowed diameter, such that the sealing body having a larger diameter compared to the narrowed portion can be moved by movement of the armature between sealing positions formed at both axial ends of the sealing (Continued)

body, wherein the sealing body (28) is a component separate from the narrowed portion and/or releasable therefrom and has a sealing portion (42) made of a polymer and/or rubber material, and also a support portion (40) made of a material different than and harder than the sealing portion, and is designed for force-fit connection to the armature.

11 Claims, 2 Drawing Sheets

(52) U.S. Cl.
CPC ...... *F16K 31/0606* (2013.01); *F16K 31/0675* (2013.01)

(58) Field of Classification Search
USPC .................................................. 251/129.15
See application file for complete search history.

(56) References Cited

U.S. PATENT DOCUMENTS

| | | | | |
|---|---|---|---|---|
| 4,074,700 A * | 2/1978 | Engle | ................... | B60T 8/3615 |
| | | | | 137/625.27 |
| 4,298,027 A | 11/1981 | Neff | | |
| 5,184,773 A * | 2/1993 | Everingham | ...... | B60H 1/00485 |
| | | | | 137/115.25 |
| 6,425,409 B1 * | 7/2002 | Cross | ................ | F16K 31/0606 |
| | | | | 137/15.18 |
| 7,040,596 B2 * | 5/2006 | Sonoda | ..................... | F16K 1/36 |
| | | | | 251/129.15 |
| 7,124,998 B2 * | 10/2006 | Steinruck | .................. | F16K 1/42 |
| | | | | 251/129.21 |
| 7,194,911 B2 * | 3/2007 | Bordonaro | ............ | F16K 27/003 |
| | | | | 73/756 |
| 7,401,762 B2 * | 7/2008 | Ohmori | ..................... | F16K 1/36 |
| | | | | 137/340 |
| 7,703,744 B2 * | 4/2010 | Wagner | ............... | F16K 31/0693 |
| | | | | 251/129.15 |
| 9,556,961 B2 * | 1/2017 | Shiota | .................... | F25B 41/062 |
| 9,993,821 B2 * | 6/2018 | Sugiura | .................. | B01L 3/567 |
| 2010/0108927 A1 * | 5/2010 | Perz | ..................... | F16K 31/0655 |
| | | | | 251/129.15 |
| 2010/0176323 A1 * | 7/2010 | Nguyen | .................. | F16K 11/24 |
| | | | | 251/129.15 |
| 2011/0260085 A1 * | 10/2011 | van der Zee | ....... | F16K 31/0627 |
| | | | | 251/129.15 |
| 2014/0175312 A1 * | 6/2014 | Jamison | .................... | F16K 1/34 |
| | | | | 251/129.15 |
| 2019/0118690 A1 * | 4/2019 | Beuschel | ................ | F16K 31/10 |

FOREIGN PATENT DOCUMENTS

| | | |
|---|---|---|
| DE | 19606318 A1 | 8/1997 |
| EP | 1643174 A1 | 4/2006 |
| EP | 2711594 A1 | 3/2014 |
| FR | 2552196 A1 | 3/1985 |
| WO | 2013191541 A1 | 12/2013 |

OTHER PUBLICATIONS

International search report for patent application No. PCT/EP2016/082010 dated Mar. 21, 2017.

* cited by examiner

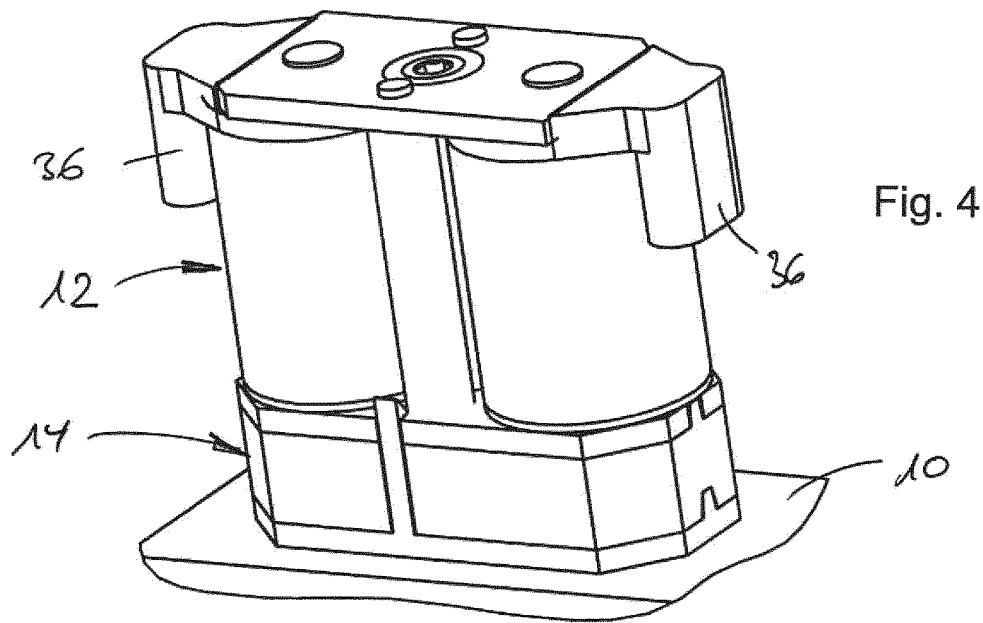
Fig. 4
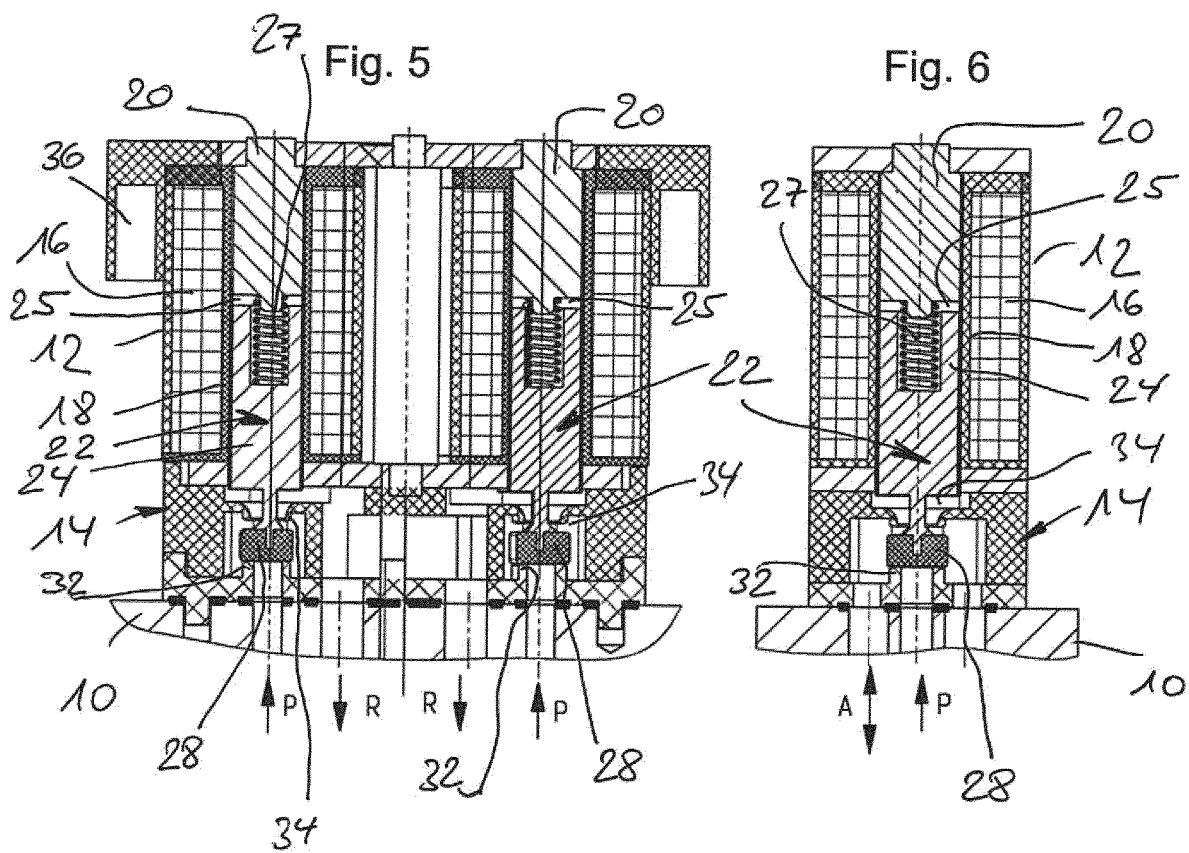
Fig. 5
Fig. 6

ELECTROMAGNETIC VALVE AND USE THEREOF

BACKGROUND OF THE INVENTION

The present invention relates to an electromagnetic valve according to the preamble of the main claim. Furthermore, the present invention relates to the use of such an electromagnetic valve.

Electromagnetic valves according to this class are generally known from the most recent background art; in the case of these, usually, the valve function is caused by means of an armature unit, designed to be moveable and provided in a valve housing relative to a stationary coil means, which, being typically provided with a sealing means, can open or close an assigned valve seat of an inlet or an outlet of the magnetic valve in controlled manner according to the current-flow status of the coil means and an armature position caused thereby.

A preferred field of application for the use of such a technology presumed to be generic and generally known is automotive technology; here, for example, known electromagnetic valves according to the class are suitable for a variety of switching and adjustment tasks in connection with a pneumatic or a hydraulic fluid.

Thus, DE 196 06 318 C2, for example, discloses a technology according to the preamble according to the most recent background art, which, on the one hand, uses a sealing means provided on the end side of a turret-like armature section in the form of a sealing body in order to interact in a controlled manner with a valve seat assigned to a valve inlet in a sealing manner driven by the armature unit. On the other hand, according to this doctrine from the most recent background art, the sealing body is additionally used to open and close another fluid duct within the scope of the valve in a controlled manner at an area lying opposite to the valve seat and a related sealing section.

In particular, such an embodiment of the sealing body makes it favourably possible to provide both the valve inlet as well as at least one other (second) valve inlet or valve outlet on a joint axial side, in turn, with reference to an relative axial position to the armature unit. In other words, in a favourable way, such a magnetic valve technology can be connected on merely one side or to a (joint) area of the valve housing in units for installation and connection upstream or downstream.

The valve body known from the mentioned most recent background art, attached on the end side of a turret rod on the armature, is made of a polymer elastomer material, wherein the apparatus known from the most recent background art actuates the sealing body to close the valve inlet during operation by flowing through the coil means and thereby activating the armature unit; however, then, a counter pressure of the fluid flowing through this inlet (hydraulic oil in the most recent background art) acts against this. Then, the sealing body then blocks a backwards-flowing fluid and pressure compensation duct at an armature and sealing position located opposite.

While such a technology according to the preamble has been tried and tested for the intended purpose within the scope of a pressure regulator for a hydraulic transmission control system and is produced in large quantities, the known valve principle is, at the same time, not optimal for all conceivable embodiments. In this way, for example, the known valve, as a type of proportional valve, implements a regulating function by means of the described force conditions on the sealing body between the armature force on the one hand and the fluid counter-force on the other. However, in particular, implementation of a valve with a closed function without any flow occurring, where, namely, the sealing body is pretensioned against the valve seat usually by means of pressure spring action or similar force retention means if there is no flow into the coil means and thereby, no electromagnetic armature actuation occurs, is practically not capable of being achieved or only difficult to achieve with the technology according to the class at hand. On the one hand namely, this explicitly provides an armature pretensioning by means of the spring against a locking device; on the other hand, the known embodiment of the sealing body as a full polymer would also signify considerably disadvantages on a constructive and operative level. For example, in order to be able to reliably seal at a force corresponding to a fluid counter pressure above 10 bar, not only a correspondingly high level of spring force of a spring producing the desired closed operational state without any flow is necessary (typically a spring force of 18N to 20N would actually have to be applied to the sealing body), the polymer sealing body would be impaired or damaged due to the application of the force during the course of continuous operation or long service life in such a way that a proper seal on the valve seat is no longer ensured. In particular, it has namely been established that the elastomer seal has shown a so-called shear punching effect, namely an irreparable mechanical deformation of the sealing body with regard to tits attachment on the end-side area of the armature unit.

Such a problem additionally attains significance due to the fact that, for example, in contrast to the pressure regulation of a hydraulic oil according to the class for a hydraulic valve, an intended use as a pneumatic valve and, in particular, as a pneumatic switch valve with a secure seal in the closed state without any flow is practically impossible.

SUMMARY OF THE INVENTION

Therefore, the object of the present invention is to improve an electromagnetic valve according to the preamble of the main claim both with regard to its sealing properties in conjunction with the valve seat, as well as to improve its suitability for a high number of switching operations and for withstanding a continuous stress load, thereby significantly increasing its usable service life. Thereby, at the same time, a solution is devised, which is easy to manufacture in an automated manner with a low level of manufacturing costs.

The task is achieved by means of an electromagnetic valve with the features of the main claim; favourable further embodiments of the invention are described in the subclaims. Additional protection within the scope of the invention is additionally claimed for a use of the electromagnetic valve for the automotive context, wherein this use is intended for use as a pneumatic valve, being furthermore preferred in pairs.

In a favourable way according to the invention, the sealing body is designed to be composed of a plurality of parts or as a multi-component part in such a way that sealing section made of a polymer or a rubber material is joined to a carrier section, which is made from a material that is different from the material of the sealing section, which is also preferably (and relative to the material of the sealing section) designed to be hard. In turn, this carrier section is designed to form a force-fit connection with the armature means, at least in the sealing state on the valve seat or in an armature position on the valve seat.

A favourable effect of this embodiment according to the invention of the sealing body is that, on the one hand, a low-level-sealing operation and thereby operation for long service and operational lifetime is made possible. In particular, the disadvantageous shear punching or damage to the polymer sealing material identified in the most recent background art can be avoided by separately designing the carrier section, which implements the force-fit connection with the armature means (and, in particular, there, an end-side turret section). At the same time, this polymer or rubber material for the sealing section according to the invention, which is favourable with regard to its sealing effect, remains at those sections and areas of the carrier section, which are then required for the intended sealing effect so that, according to the invention, the problem context evident from the most recent background art can be effectively overcome.

Thereby, the multipart design of the sealing body implemented with a plurality of components also allows for a simple, automated and thereby potentially inexpensive manufacturability so that an evident disadvantage of the elaborate sealing body considerably rescinds in the face of the constructive/mechanic advantages. Thereby, the present invention, as is, in particular, also seen as being to be further developing, is then preferably suited for the implementation of a closed design of the electromagnetic valve without any flow, where the force retention means, for example, in the form of an appropriately dimensioned and pressure spring providing appropriate counter-force against the incoming fluid, secures the sealing seat itself against wear and damage in the case of a long service life and a high number of operational cycles. Last but not least, the suitability for a—preferred—implementation of the electromagnetic valve according to the invention as a pneumatic valve is ensured, with the accordingly favourable effects on the sealing effect on the valve seat, even in the case of pressure being applied to the pneumatic fluid.

In a favourable way according to the invention and further developing on a constructive level, the present invention allows for at least one second valve inlet or valve outlet to be provided within the valve housing on the same axial side as the first valve inlet so that the present invention, for example, in the preferred use within the automotive context, combines the discussed favourable operational characteristics with favourable installation characteristics and simple connectability from an (axial) side.

Thereby, in particular, in addition to the preferred embodiment as a pneumatic valve, the option is made available to design the invention as a so-called 3/2 (switch) valve, namely with two switch positions achieved by means of the armature means and three inlets and outlets, wherein the first valve inlet then interact with two of the second valve inlet and valve outlets according to the invention and, depending on the switch position, these second valve inlet and valve outlets can be directly connected to each other or, however, a connection to the first valve inlet can be established.

In the case of this embodiment, according to the invention, the sealing body grips onto the valve seat on the one end on an axial level and, on the other end, it serves to switch between opening and closing a fluid-conveying transition section between the two second valve inlets or valve outlets.

According to the invention, in a further developing and favourable way, it is furthermore provided to design the carrier section of the sealing body in such a way, in particular, to assign an end-stop to this, which can interact with an abutment provided on the end side of a turret section, in particular a ring section. In this way, a more effective and increased low-wear application of force into the sealing body is not only possible, but such an embodiment, in particular, if, for example, the carrier section is designed to hold an assigned and adapted connecting section of the armature means via a groove or a bore hole, allows for simple installation and, if applicable, also de-installation in the event of any repair or maintenance.

Additionally, in a way that is particularly favourable for automated serial production, the carrier section of the sealing body is made of a plastic or metal material and, furthermore preferred, is manufactured by means of an appropriate injection (moulding) method, wherein, on and/or in such a carrier section, the polymer sealing section is attached by means of injection moulding or overmoulding, as an alternative, via insertion or gluing in. Being particularly preferred, the polymer sealing section can additionally also be made as an assembly extending (in sections) through the carrier section, for example, by means of a suitable injection method acting on both sides of the sealing body in an axial direction, here, in turn, in addition or as an alternative, with suitable cross-sectional profiles, sections or the like in order to implement optimal force characteristics in a possible high-pressure context at the valve inlet in the present case, in particular, also in the transition between the carrier section and the sealing section of the sealing body.

As a result, by means of the present invention, the technology known from the most recent background art is improved in a surprisingly simple and elegant way, and, improved both with respect to service life, wear and sealing properties, as well as regarding being suitable for a (for example, pretensioned by spring force) closed valve without any flow (sealing without any flow), which is favourably sufficient for the increased sealing tightness requirements of a pneumatic fluid.

Thereby, in accordance with the use according to the invention, the present invention is excellently suited for pneumatic adjustment purposes in an automotive context, and there, in particular for a commercial vehicle transmission controller. However, the invention is not limited to this use. The present invention is rather suitable for any intended purpose of an electromagnetic valve, where the favourable sealing properties of the sealing body according to the invention with the mechanical, manufacturing and service life properties can be taken advantage of.

BRIEF DESCRIPTION OF THE DRAWINGS

Other advantages, features and details of the invention result from the following description of the preferred exemplary embodiments as well as based on the drawings. The figures show:

FIG. 4: a prospective view of the electromagnetic valve as a context illustration within the scope of the invention and FIG. 5, FIG. 6: longitudinal cross-sectional illustrations of the electromagnetic valve pair of FIG. 4 for the context of the invention to the extent this exists as an option for using the sealing body according to the invention contained in FIG. 2, 3.

DETAILED DESCRIPTION

Figure 1:
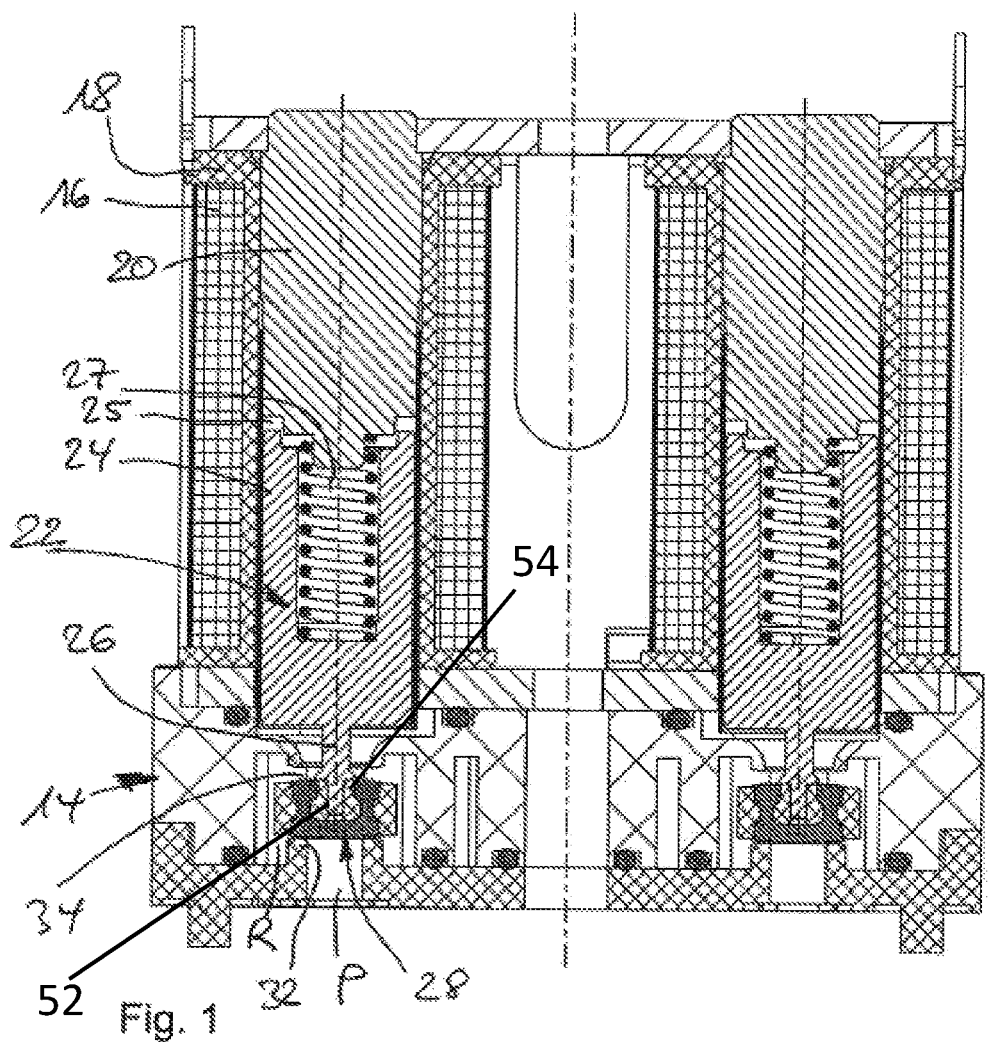
FIG. 1: a longitudinal cross-sectional view through an arrangement of a pair of electromagnetic valves in accordance with a first exemplary embodiment of the invention extending vertically in the figure plane into the respective axial direction.

In a prospective view, FIG. 4 shows a use context of the electromagnetic valve according to the invention in accordance with a first exemplary embodiment as a pair of electromagnetic valves, which are arranged adjacent to one another and mounted to an underlying unit, which is not further specified. FIGS. 5 and 6 show longitudinal cross sections of such an apparatus, wherein the view of FIG. 6 in relation to the cross-sectional view of FIG. 5 is rotated by 90° around a (vertical) axis; FIG. 6 only shows an arrangement of the pair accordingly.

Each of the electromagnetic valves has, lying on top in the figure plane, a coil area 12, to which a lower connection and valve seating area 14 connects. In turn, in the case of the embodiment of the electromagnetic valves as a 3/2 valve respectively, meaning with three connections and two switch positions, a valve inlet P and outlets A and R are provided, wherein, as is evident from the comparison in FIGS. 5 and 6, in the case of this arrangement in the housing section 14, the outlets A (also called a working connection) and R (also called a vent connection) are provided around the inlet P axially arranged in the centre.

Within the upper housing section 12, a stationary coil winding 16 is held on a coil carrier 18. This encloses, axially in the figure plane above, a stationary core section 20, designed in contrast to which, being moveable in the axial direction, an armature unit 22 causes the valve function as a reaction to the coil 16 being flowed through. More specifically, the armature unit 22 has a cylindrical armature body 24, which forms an air gap 25 on one end with relation to the stationary core 20 and is pretensioned by means of the action of the pressure spring 27 into a downwards direction. A turret section 26 abuts the cylindrical armature body 24 on the opposite end of the core 20, at which, in turn a sealing body 28 is attached on the end side.

In the configuration shown and by means of pretensioning by means of the spring 27, the sealing body 28 is seated with a (orientated downwards in the figure) end-side front surface on a valve seat 32 formed in the housing section 14 located at the base, which is assigned to inlet P. Accordingly, in the non-flowing state, this inlet P is sealed so that the valve implements a close configuration without any flow in the embodiment shown.

The cross-sectional views in FIG. 5, 6 additionally illustration that, on the other end of the sealing body 28, namely at the side facing the core 20 and the armature body 24, the sealing body 28 is designed to seal an outlet passage 34, which opens and closes a connection in the housing section 14 between the inlet and the outlets A and R. Specifically, in the case of flowing through the coil 16, the armature 22 would be moved upwards in the axial direction, thereby being along the figure plane in the vertical direction until the armature body 24 abuts the core 20 subject to the air gap 25 closing. Likewise, the turret section 26 takes the seated sealing body 28 along with it upwards until this seals the outlet passage 34, acting inasmuch as another valve seat. Thereby, in this—flowed through—valve position, the inlet P is open, incoming (pneumatic) fluid can flow in accordingly and flow out through outlet A. In contrast, by means of the outlet opening 34 being locked in this position, a fluid communication between A and R is blocked, as is made possible in the closed state without any flow in FIG. 5, FIG. 6.

As illustrated in FIGS. 4 and 5, the valves configured and operable in this manner are arranged adjacent to one another so that, depending on the electrical control via the plug sections 36 evident in FIGS. 4 and 5, a corresponding flow signal is applied (the specific electrical contacts are not shown).

Figure 2:
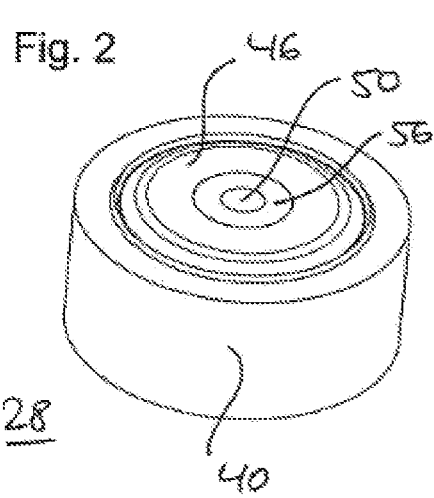
FIG. 2: a prospective view of the sealing body shown detached from the electromagnetic valve in the exemplary embodiment of FIG. 1.
Figure 3:
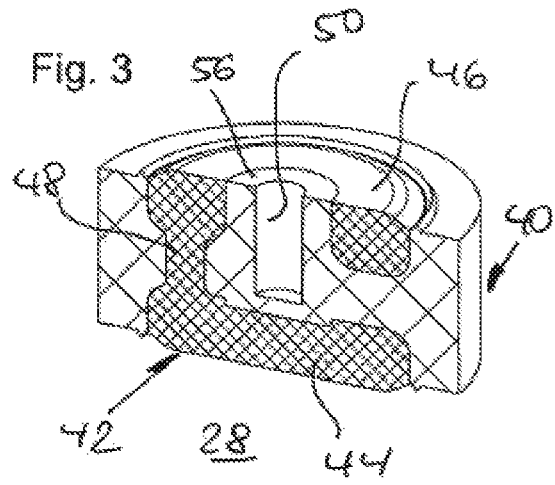
FIG. 3: a perspective cross-sectional view of a sealing body in accordance with FIG. 2.

FIGS. 2 and 3 in detail the favourable embodiment of the sealing body 28 of the present exemplary embodiment, which is merely schematically indicated in FIG. 5, 6. In the same way, analogous to the illustration of FIG. 5, FIG. 1 illustrations the sealing effect of a sealing body designed in accordance with FIG. 2, FIG. 3.

It is particularly apparent from the prospective cross-sectional view of FIG. 3 that the sealing body 28 is made of a plurality of materials. In particular, this has the carrier section 40 made of a hard plastic material, which can be manufactured by means of an injection moulding method, into which a sealing section 42 made of a polymer material is formed and inserted. Specifically, this sealing section is implemented on a front side as a continuous sliding section 44, for example orientated toward the valve seat 32 in the exemplary embodiment, while, located opposite, a polymer ring 46 is formed, which is connected to the section 44 by means of bar sections 48 arranged in a distributed manner in the circumferential direction. Accordingly, such an apparatus, for example, in the form of a multilevel injection method, can be manufactured by introducing the polymer material designated for the sealing sections into the carrier section 40.

In addition, this as a central bore hole 50 on one end, as is quite evident from FIG. 2, 3, which can interact with an end section of the armature turret section 26 in such a way that a front side cylindrical pin section 52 of the armature engages into the bore hole, which a widespread abutment section 54 forming a ring section engages a bore-hole edge 56 of the (hard) carrier body 40 to cause a force-fit connection. By correspondingly designing the dimensions, a fit is created, which, for example, when the armature unit moves in the downwards direction, takes the sealing body 28 with it by means of the force-fit connection and guides it to the valve seat 32, being additionally pretensioned by means of the spring 27. In particular, due to the force-fit connection from section 54 to the bore-hold edge 56 of the (hard) carrier section 40, additionally, the danger known from the most recent background art of damage to a polymer sealing section by shear punching or the like is prevented, because, on this force-fit connection section, a polymer material is not provided (and is also not necessary to achieve the described sealing effect.)

Additionally, since, within the scope of the preferred exemplary embodiment, pressure is applied to the inlet P—with operating pressures above 10 bar in the described preferred embodiment as a pneumatic control system—a force-fit connection in the case of a downwards movement of the armature unit, meaning detaching from the valve seat 32, is not important since this application of force occurs due to the fluid flowing into P. However, embodiments are conceivable where, for example, a press fit is implemented between the cylindrical turret end 52 and the bore hole 50 so that a carry-along effect can take place in both directions of the armature movement.

The cross-sectional view in FIG. 1 illustrates that the polymer material provided within the sealing body 28 only in sections can carry out a sealing effect both reliably and in an optimised manner, while, at the same time, the carrier section 40 made of a hard plastic material enclosing the polymer material provides for the best mechanical properties with the lowest wear characteristics.

The present invention is not limited to the exemplary embodiment shown, rather, both the preferred embodiment as a 3/2 valve as well as the embodiment of the sealing body by means of the plastic carrier section are merely examples; both the valve configuration as well as the material selection and the respective geometries, including the possible geometries for the sealing body, can be arbitrarily varied and adapted to the respective circumstances at hand.

The invention claimed is:

1. An electromagnetic valve, comprising:

armature means (22) designed to be moveable along an axial direction in a valve housing (14) as a reaction to current flowing through stationary coil means (16), wherein the armature means (22), at one axial end, has sealing means (28) designed to interact with a valve seat (32) assigned to a first valve inlet (P), wherein at least one second valve inlet or outlet (A, R) in the valve housing can be opened by action of the armature means to the first valve inlet (P), and wherein the sealing means is a sealing body (28), the sealing body (28) having opposed axial ends, and the sealing body (28) being provided on a portion (26) of the armature means of narrowed diameter, such that the sealing body has a larger diameter compared to the narrowed diameter and can be moved by the movement of the armature means between sealing positions formed at both opposed axial ends of the sealing body, wherein the sealing body (28) is designed as a component separate from the portion (26) of the armature means of narrowed diameter and has a sealing portion (42), made of a polymer or rubber material, and also a carrier portion (40) which is made of a material different than and harder than the material of the sealing portion, and which is designed for force-fit connection to the armature means, wherein the sealing portion (42) is configured to act axially on both opposed axial ends of the sealing body (28), and wherein the sealing portion (42) comprises a continuous disk section (44), a polymer ring (46), and web section 48 connecting the continuous disk section (44) and the polymer ring (46), wherein the sealing portion extends through the carrier portion (40) such that the continuous disc section (44) is positioned at one of the opposed axial ends of the sealing body (28), and the polymer ring (46) is positioned on the other of the opposed axial ends of the sealing body (28), the web section (48) being disposed in a distributed manner in a circumferential direction.

2. The electromagnetic valve according to claim 1, wherein the at least one second valve inlet or outlet is formed in the valve housing (14) on a same opposed axial end of the sealing body (28) as the first valve inlet.

3. The electromagnetic valve according to claim 1, wherein the electromagnetic valve is implemented in a pneumatic valve or a valve providing two armature positions of the armature means, wherein the at least one second valve inlet or outlet comprises a plurality of second valve inlets and outlets, and wherein at least two of the plurality of second valve inlets and outlets are fluidically (34) connected to each other at one of the armature positions.

4. The electromagnetic valve according to claim 3, wherein the sealing portion (42) is designed on the sealing body in such a way that at one end it can open and close the valve seat (32) assigned to the first valve inlet (P) and, at another end, the sealing portion (42) can open and close a transition section (34) between the at least two of the second valve inlets and outlets (A, R) designed for conveying fluid depending on an armature position of the armature means.

5. The electromagnetic valve according to claim 1, wherein force retention means is assigned to the armature means to pretension the armature means (22) in a non flow state of the coil means against the valve seat (32) assigned to the first valve inlet (P).

6. The electromagnetic valve according to claim 1, wherein the first valve inlet or assigned valve seat is provided along the axial direction, and a fluid can be applied thereto in such a manner that a fluid pressure of the fluid can exert a force onto the sealing body that can detach the sealing body from the valve seat.

7. The electromagnetic valve according claim 1, wherein the carrier section (40) of the sealing body has an end-stop (56) formed to interact with an abutment (54) provided at the tapered section (26, 52) of the armature means.

8. The electromagnetic valve according to claim 1, wherein the carrier section has a bore hole (50) or a groove to hold a connecting section (52) of the armature means.

9. The electromagnetic valve according to claim 1, wherein the carrier section (40) of the sealing body is made of a plastic or metal material, by means of which the sealing section (42) is connected via an injection and/or overmoulding or by inserting or gluing in.

10. A use of the electromagnetic valve according to claim 1 as a pneumatic valve for carrying out fluid switching operations in motor vehicles.

11. The use of claim 10, wherein the fluid switching operations are for commercial vehicle transmission control systems.

* * * * *